United States Patent [19]

Sander

[11] Patent Number: 4,929,067
[45] Date of Patent: May 29, 1990

[54] METHOD AND APPARATUS FOR ANAMORPHICALLY SHAPING AND DEFLECTING ELECTROMAGNETIC BEAMS

[75] Inventor: Ingolf Sander, Cuputino, Calif.

[73] Assignee: Verbatim Corporation, Sunnyvale, Calif.

[21] Appl. No.: 292,720

[22] Filed: Jan. 3, 1989

[51] Int. Cl.$^5$ .................. G02B 13/10; G02B 13/08
[52] U.S. Cl. ......................... 350/421; 350/286; 350/420
[58] Field of Search ............... 350/286, 485, 486, 420, 350/421

[56] References Cited

U.S. PATENT DOCUMENTS

| | | | |
|---|---|---|---|
| 4,623,225 | 11/1986 | Forkner | 350/421 |
| 4,759,616 | 7/1988 | Marchant | 350/421 |

*Primary Examiner*—Bruce Y. Arnold
*Assistant Examiner*—David R. Parsons
*Attorney, Agent, or Firm*—Warren W. Kurz

[57] ABSTRACT

A method and apparatus for anamorphically shaping a beam of radiation and for deflecting such beam by 90°. The apparatus consists of a prism having at least four faces, two of such faces being parallel. The prism is arranged to receive a beam at the Brewster angle $\Theta_B$, and is adapted to deflect the beam by 90° by refraction and double internal reflection. The prism faces define four internal angles of $\Theta_B$, $90°+\Theta_B$, $90°-\Theta_B$ and $180°-\Theta_B$.

4 Claims, 2 Drawing Sheets

METHOD AND APPARATUS FOR ANAMORPHICALLY SHAPING AND DEFLECTING ELECTROMAGNETIC BEAMS

BACKGROUND OF THE INVENTION

This invention relates to methods and apparatus for anamorphically shaping and deflecting beams of electromagnetic radiation, for example, a radiation beam produced by a diode laser. More particularly, it relates to a method and apparatus for deflecting a beam by precisely 90° while anamorphically altering its intensity profile.

The advent of the diode laser has greatly expanded the need to handle laser beams of elliptical cross section. Because these lasers have very asymmetric active regions, they may exhibit beam divergence ratios in the 1:2–1:4 range. When the beam is collimated by a collector lens, it retains its ellipticity. The beam ellipticity, in turn, affects (usually reduces) the efficiency with which the beam can be focused through a circular objective lens.

Heretofore, it has been common to use a Littrow-type prism (i.e., a three-sided right angle prism) for anamorphically expanding an elliptical beam to make it more circular. The output of a diode laser is predominantly polarized in the TE state, and the collimated beam is polarized parallel to its minor axis. If, as shown in FIG. 1, the beam B is incident at the Brewster angle $\Theta_B$, on the hypotenuse face of a Littrow prism in which one of the acute angles is cut at the Brewster angle, it will be anamorphically expanded by a factor n in a direction of the minor axis, where n is the refractive index of the prism. While this is a good approach for reducing the ellipticity of a diode laser beam, it is disadvantageous from the standpoint that the beam is deflected by an inconvenient angle $\alpha$, where $\alpha = 2\Theta_B - 90°$. For ordinary glass prisms, $\alpha$ is between 20° and 30°. For many applications, it is desirable that the expanded beam be either parallel to if not co-linear with, the incoming beam or, alternatively, be deflected during the expansion by some convenient angle, for example, 90°.

In U.S. Pat. No. 4,759,616 issued in the name of A. B. Marchant, there is disclosed a method for anamorphically shaping a beam of radiation and for deflecting such beam by precisely 90°. This method also makes use of a Littrow-type prism (or a truncated version of such prism) but, unlike the optical arrangement described above with reference to FIG. 1, the prism is arranged in the beam path so that the beam enters the prism face opposite the $\Theta_B$ angle at (or near) the Brewster angle. Upon entering the prism, the refracted beam is reflected by that prism face opposite the $(90° - \Theta_B)$ angle and emerges from the prism through the hypotenuse face at 90°. See FIG. 2. While this beam-shaping and deflecting technique has the advantage of deflecting the beam through convenient angles, the prism employed can be difficult to optically align with the laser source and other optical elements which operate on the beam as it enters and exits the prism.

SUMMARY OF THE INVENTION

An object of this invention is to provide a more readily alignable prism of the above type. Another object is to provide a method for using such prism to anamorphically shape (i.e. non-uniformly expand or contract) a beam of electromagnetic radiation and to deflect such beam by 90°.

Like the beam-shaping and deflecting prism of the prior art (FIG. 2), the prism of the invention has at least four lateral faces, two being parallel. Also, like the prior art prisms, two of the internal prism angles are $\Theta_B$ (the Brewster angle) and $180° - \Theta_B$. Unlike the prior art prism, the other two internal angles formed by the planes of the prism faces are $90° - \Theta_B$ and $90° + \Theta_B$. According to the method of the invention, this prism is positioned within a beam path so that the beam enters the prism through one of the non-parallel faces from a direction parallel to the prism's parallel faces, is refracted toward one of the parallel faces and undergoes double internal reflection, first from the parallel face toward which the beam is refracted and then from the other of the two non-parallel faces. Thereafter, the beam emerges from the prism through and perpendicular to the other of the two parallel faces.

The invention and its advantages will become more apparent to those skilled in the art from the ensuing detailed description of the preferred embodiments, reference being made to the accompanying drawings.

DETAILED DESCRIPTION OF PREFERRED EMBODIMENTS

Figure 1:
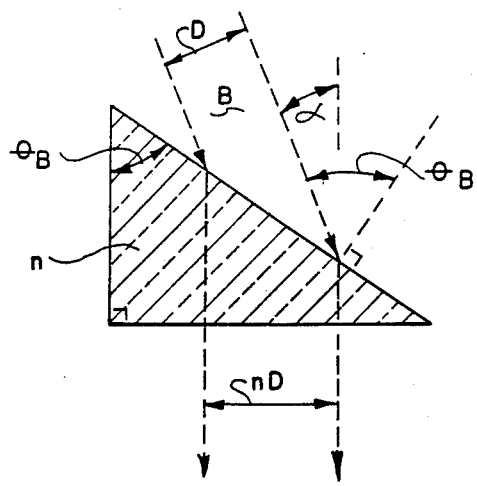
FIGS. 1 and 2 illustrate anamorphic beam expansion and deflection schemes as practiced by the prior art.
Figure 2:
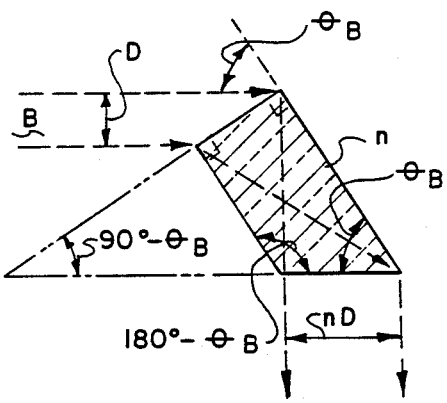
Figure 3:
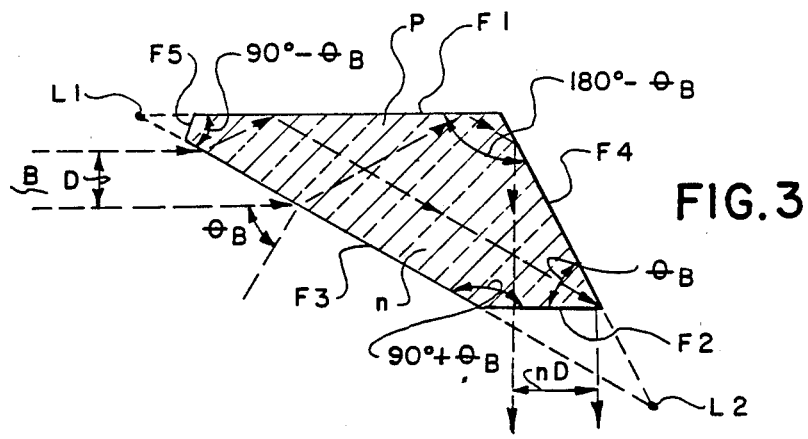
FIG. 3 illustrates the anamorphic beam expansion and deflection concept of the present invention.

Referring to FIG. 3, the prism P of the invention is illustrated as being five-sided, comprising five lateral faces, F1–F5. As will be apparent, face F5 is non-essential and results only from truncating, for the sake of compactness, the converging faces F1–F3 short of their line of convergence L1, perpendicular to drawing plane. Faces F1 and F2 are parallel, and the respective planes of faces F3 and F4 converge toward a line L2. The respective planes of prism faces F1–F4 define four internal angles, $\Theta_B$, $90° + \Theta_B$, $90° - \Theta_B$, and $180° - \Theta_B$, where $\Theta_B$ is the Brewster angle defined by $\tan^{-1} n$, where n is the refractive index of the prism material. When the refractive index of the prism is about 1.7, which is relatively common for ordinary glass, $\Theta_B$ is about 60°. Thus, for an ordinary glass prism having a refractive index of 1.7, the above-mentioned internal angles are 60°, 150°, 30° and 120°.

According to the present invention, prism P is positioned in the optical path of a beam B of electrogmagnetic radiation so that the beam is incident on face F3 at the Brewster angle $\Theta_B$. Assuming that the beam is plane polarized, as is the output of a diode laser, and that the plane of polarization is parallel to the plane of incidence, beam B will be refracted at the prism/air interface with little or no light loss. The refracted beam then undergoes double internal reflection, being totally reflected by prism faces F1 and F4, and emerges from the prism through and perpendicular to prism face F2. It will be noted that the output beam is deflected 90° with respect to the input beam, and the beam diameter D will undergo an expansion by a factor of n, the refractive index of the prism material. There is, of course, no expansion of the beam profile in a direction perpendicular to the drawing.

Figure 4:
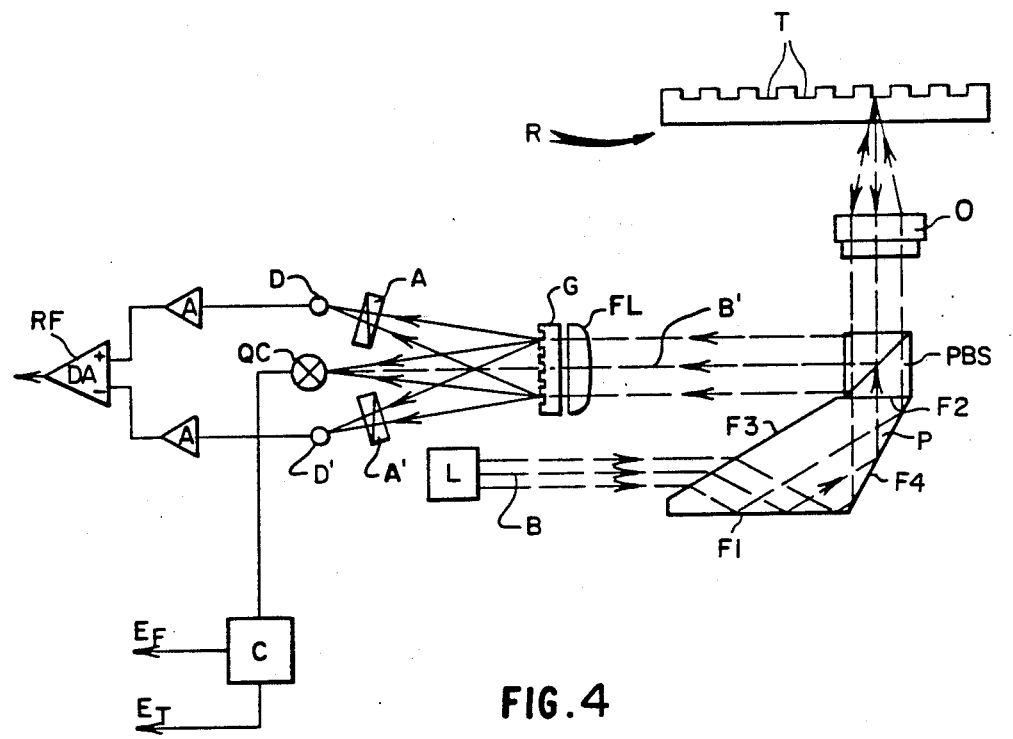
FIG. 4 is a schematic illustration of a magneto-optic recording system embodying the invention.

In FIG. 4, the prism of the invention is shown as embodied in a magneto-optic recording system. Such a system comprises a laser source L for producing a plane-polarized beam B of radiation. As mentioned above, the intensity profile of such a beam is usually elliptical and it is desired to circularize this profile by expanding it in the direction of the minor axis. Such anamorphic expansion is achieved by prism P which, as already explained, also serves to deflect the beam by 90°. While the prism disclosed in the aforementioned U.S. Pat. No. 4,759,616 will achieve the anamorphic shaping and deflection functions of the prism of this invention, the unique arrangement of the faces of the prism of the invention and its position in the beam path allow one face (face F1), which is the surface of first reflection to be positioned parallel with the axis of the laser beam B. This greatly simplifies the optical assembly and alignment of the magneto-optic head. The beam emerging from prism face F2 then passes through a polarizing beam-splitter PBS and is brought to focus on a magneto-optic recording element R by an objective lens O. Depending on the state of magnetization of the magnetic domains along the data tracks T, the plane of polarization of beam B is slightly rotated by the well-known Kerr effect. The beam reflected from the recording element is then deflected by the beam-splitter through an astigmatizing field lens assembly FL. A diffraction grating G serves to diffract the beam into zeroth and ± first order beams. A conventional quad-cell detector is used to detect the focus and tracking accuracy from the zeroth order beam, the output of the quad-cell being processed by circuit C to produce focus and tracking error signals $E_F$ and $E_T$, respectively. The recorded data is detected differentially by passing the ± first order diffracted beams through a pair of polarization analyzers A, A', whose respective polarization axes are offset by 90°. The respective outputs of photo detectors D and D' are then processed by an amplifiers A and subtracted by a differential amplifier DA to provide a data signal RF. This magneto-optic system is more thoroughly described in the copending U.S. Application Ser. No. 234,767 filed Aug. 22, 1988, in the names of Ingolf Sander and Alan Marchant.

In the above-mentioned magneto-optic recording system a prism having a refractive index of 1.71 was employed. The approximate lengths of the prism faces were: F1=14 mm, F2=5.5 mm, F3=16 mm, F4=10 mm and F5=1.5 mm. The angle of incidence was 30.58°, i.e. which approximates the Brewster angle.

The invention has been described in detail with particular reference to certain preferred embodiments thereof, but it will be understood that variations and modifications can be effected within the spirit and scope of the invention.

I claim:

1. A method for anamorphically shaping a beam of radiation and for deflecting such beam by 90°, said method comprising the steps of
   (a) providing a prism of radiation-transmissive material, said prism having at least four lateral faces, two of said faces being parallel to each other, and the other two of said faces being nonparallel and arranged to define, in cooperation with said parallel faces, internal angles of $\Theta_B$, $90°+\Theta_B$, $90°-\Theta_B$ and $180°-\Theta_B$, where $\Theta_B$ is the intended angle of incidence of the beam on said prism, and
   (b) arranging said prism in such beam so that the beam enters the prism through one of said nonparallel faces from a direction parallel to said parallel faces, said lateral faces being arranged with respect to each other so that the beam, upon entering the prism, is refracted toward one of said parallel faces, undergoes double internal reflection, first from said one of said parallel faces and then from the other of said nonparallel faces, and emerges from said prism through said perpendicular to the other of said parallel faces.

2. A prism for anamorphically shaping a monochromatic beam of radiation and for deflecting such beam by 90°, said prism comprising radiation-transmissive element of refractive index n, said element having at least four lateral faces, the respective planes of which define four interior angles of $\Theta_B$, $90°+\Theta_B$, $90°-\Theta_B$ and $180°-\Theta_B$, where $\Theta_B$ is the intended angle of incidence of a beam on the prism.

3. The prism as defined by claim 2 wherein two of said lateral faces are parallel, one of said two faces being approximately 2.5 times the length of the other.

4. The prism as defined by claim 3 wherein the respective planes of said two faces are spaced apart approximately 3 mm.

* * * * *